United States Patent [19]

Poetsch et al.

[11] 4,240,103
[45] Dec. 16, 1980

[54] METHOD FOR THE ADDITIVE AND MULTIPLICATIVE SPURIOUS SIGNAL COMPENSATION

[75] Inventors: Dieter Poetsch, Ober Ramstadt; Werner Becker, Mainz, both of Fed. Rep. of Germany

[73] Assignee: Robert GmbH Bosch, Stuttgart, Fed. Rep. of Germany

[21] Appl. No.: 76,257

[22] Filed: Sep. 17, 1979

[51] Int. Cl.$^3$ .................. H04N 9/535; H04N 5/34
[52] U.S. Cl. ................................. 358/21 R; 358/41; 358/163; 358/167
[58] Field of Search ............ 358/163, 167, 209, 221, 358/213, 214, 41, 21

[56] References Cited

U.S. PATENT DOCUMENTS

| | | | |
|---|---|---|---|
| 3,790,705 | 2/1974 | Kamin | 358/163 |
| 3,800,078 | 3/1974 | Cochran et al. | 358/167 |
| 3,919,473 | 11/1975 | Cotter | 358/163 |

Primary Examiner—Richard Murray
Attorney, Agent, or Firm—Frishauf, Holtz, Goodman & Woodward

[57] ABSTRACT

A method and a circuit for the additive and multiplicative spurious signal compensation of a video signal are proposed. For additive spurious signal compensation, a signal is derived from the "black level" signal, stored, read-out in synchronism with the video signal to be corrected and the thus formed correction signal is subtracted from the video signal. For multiplicative spurious signal compensation, a signal is derived from the "white level" signal, its reciprocal value is formed, stored, read-out in synchronism with the video signal to be corrected and the thus formed correction signal is multiplied with the video signal. A three channel system for color television signals is disclosed.

8 Claims, 2 Drawing Figures

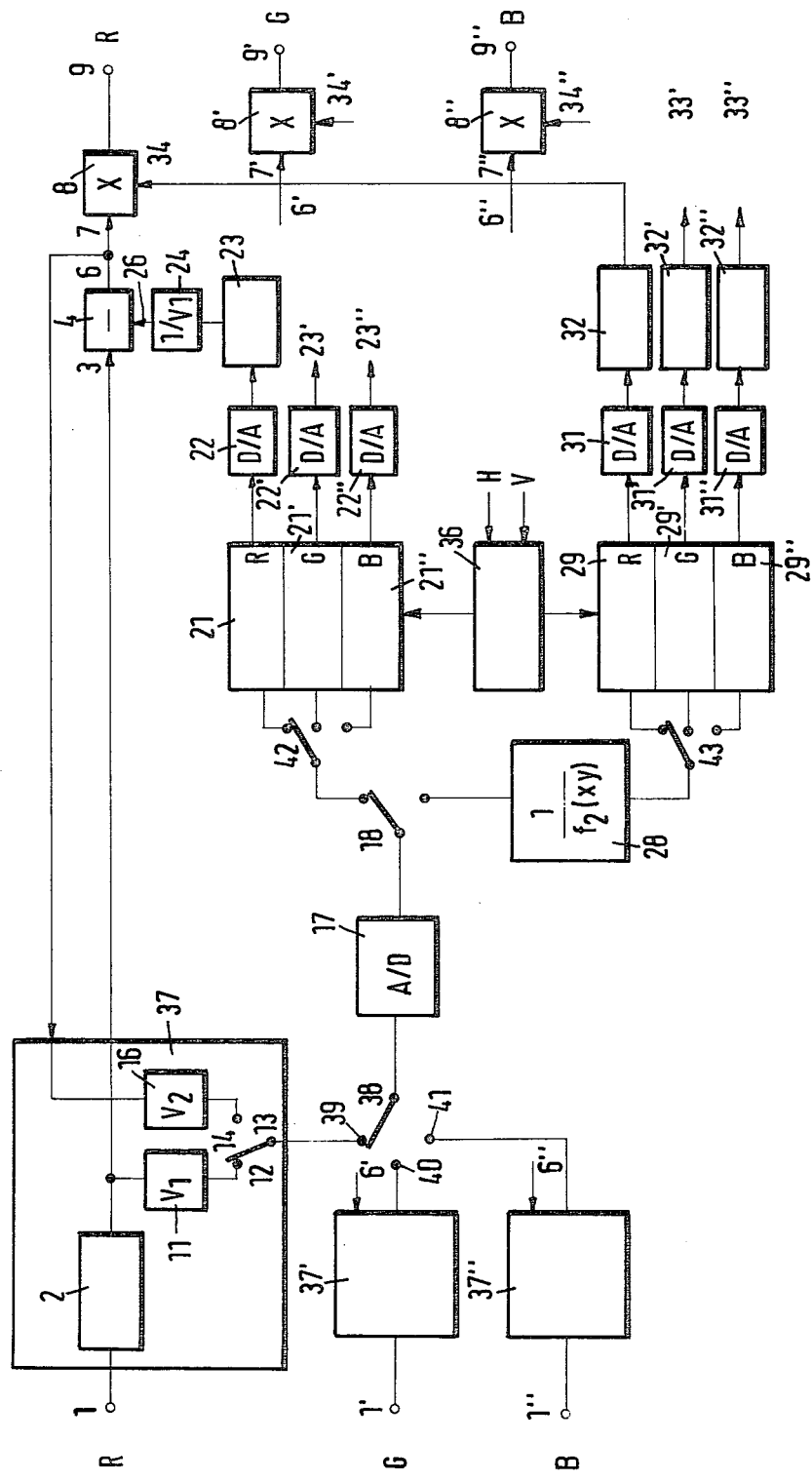

METHOD FOR THE ADDITIVE AND MULTIPLICATIVE SPURIOUS SIGNAL COMPENSATION

BACKGROUND OF THE INVENTION

The present invention relates to a method and apparatus for the compensation of spurious signals in a video signal.

With picture signal sources, for example television cameras and television film scanners comprising photoconductive tubes, semiconductor sensors or flying spot scanners, spurious interference signals exist in both the horizontal frequency region and in the vertical frequency region, superimposed on the useful picture signal partially in an additive manner and partially in a multiplicative manner. The additive spurious signals are produced by impurities in the target of the vidicon tubes and imperfections in the crystal of the semiconductor sensors. These imperfections are particularly visible in the dark portions of the picture and influence the dark current. Multiplicative spurious signals are largely produced by vignetting of the objective or illumination errors at the light source during film scanning, by imperfections in the crystal and burning-in of the target of vidicon tubes, by grain structure and burning-in of the flying-spot scanning tubes and by variations in sensitivity of the light sensitive regions of the semiconductor sensors. The multiplicative spurious signals are a function of the exposure time.

These interference signals may be expressed as follows: $E(x, y) = k_2 \cdot f_2(x, y) \cdot I(x, y) + k_1 \cdot f_1(x, y)$, wherein E (x, y) represents the video signal as a function of the exposure location in x, y co-ordinates, I (x, y) represents the exposure at the co-ordinates x, y, $k_1$ and $k_2$ represent constants, $f_1$ (x, y) represents the additive spurious signal at the co-ordinates x, y, $f_2$ (x, y) represents the multiplicative spurious signal at the co-ordinates x, y.

Previously, it was customary to compensate a portion of the spurious signals by additive and multiplicative sawtooth and parabola functions. This method fails with complicated interference functions, for example burning-in of the target or of the flying-spot scanning tubes or with variations in sensitivity of the light sensitive regions of the semiconductor sensors.

An optimal solution of the interference problem is only provided by detecting the deviation of each individual picture element from the desired value, storing the said value and generating a correction signal improved to that extent. Consequently, the corrected signal would be expressed:

$$E'(x, y) = \frac{k_2 \cdot f_2(x, y)}{k_3 \cdot f_2(x, y)} \cdot I(x, y) + k_1 \cdot f_1(x, y) - k_1 \cdot f_1(x, y) = k \cdot I(x, y).$$

That means that a division of the multiplicative components and a subtraction of the additive components would need to take place. However, in practice, it has not been possible to carry out the division of wide band analogue video signals with sufficient quality because modulation dependent frequency response errors and signal-to-noise ratio deterioration as well as temperature instability act in an interfering manner.

A system is known from U.S. Pat. No. 3,919,473 in which the video signal is digitalised and in the periods in which the video signal represents only spurious signals, the video signal is digitally stored in a memory in the line direction and in the frame direction. After digital to analogue (D/A) re-conversion, this signal is then subtracted from the input signal during a normal scanning period. However, only additive spurious signal components can be corrected with this method.

From the BBC Report 1976/4, especially FIG. 13 on page 11, it is further known to digitalise the video signal, then to convert to logarithms, to derive the correction signal therefrom, to store the latter and to subtract it from the video signal, to pass the thus produced signal to an anti-logarithmic stage and then to a D/A converter at the output from which the spurious signal compensated picture signal can be extracted. This method has the disadvantage that it is very expensive due to the logarithmic and anti-logarithmic conversions. A further disadvantage exists due to the fact that the video signal must also undergo logarithmic and anti-logarithmic conversion and must, therefore, be additionally deteriorated.

SUMMARY OF THE INVENTION

The present invention provides a method for compensating for spurious signals in a video signal produced by a picture signal generator, comprising the steps of deriving a first signal from the black level signal of the video signal for all picture elements, storing said first signal, reading out said first signal in synchronism with the video signal to be corrected, subtracting a thus formed first compensating signal from the video signal, deriving a second signal from the white level signal of the video signal for all picture elements, producing the reciprocal value of the second signal, storing said reciprocal value, reading out said stored value in synchronism with the video signal to be corrected, and multiplying a thus formed second correction signal with the video signal.

The present invention also provides apparatus for compensating for spurious signals in a video signal comprising a subtraction stage (4) having a first input (3) to which is applied a video signal to be corrected and a second input (26), means for deriving a first signal from the black level of the video signal, a first store (21) having an input for receiving the first signal and having an output connected to the second input (26) of the subtraction stage (4), the store (21) also having control inputs connected to outputs from counting means (36) for synchronising the read-out of the signals in the store (21) with the video signal, a multiplication stage (8) having a first input (7) connected to an output (6) from the subtraction stage (4), a reciprocal value stage (28) having an input connected to the output (6) from the subtraction stage (4), means for deriving a second signal from the white level of the video signal, and a second store (29) for storing the second signal and having an input to which is connected to the output from the reciprocal value stage 28 and control inputs connected to outputs from counting means (36), the second store (29) further having an output connected to a second input (34) of the multiplication stage (8), a corrected video signal being extracted from an output (9) of the multiplication stage.

The preferred embodiment of the present invention is less expensive, more temperature stable and can be used for wide band signals without deterioration of the video signal. Preferably, the first and second signals are digitalised and stored in a digital form. The method and apparatus can be applied with advantage to a three channel colour television video signal.

BRIEF DESCRIPTION OF THE DRAWINGS

In order that the present invention be more readily understood, two embodiments of the invention will be described by way of example with reference to the accompanying drawings, in which:

FIG. 2 is a block diagram of a circuit for a three channel picture signal generator.

DESCRIPTION OF THE PREFERRED EMBODIMENTS

Figure 1:
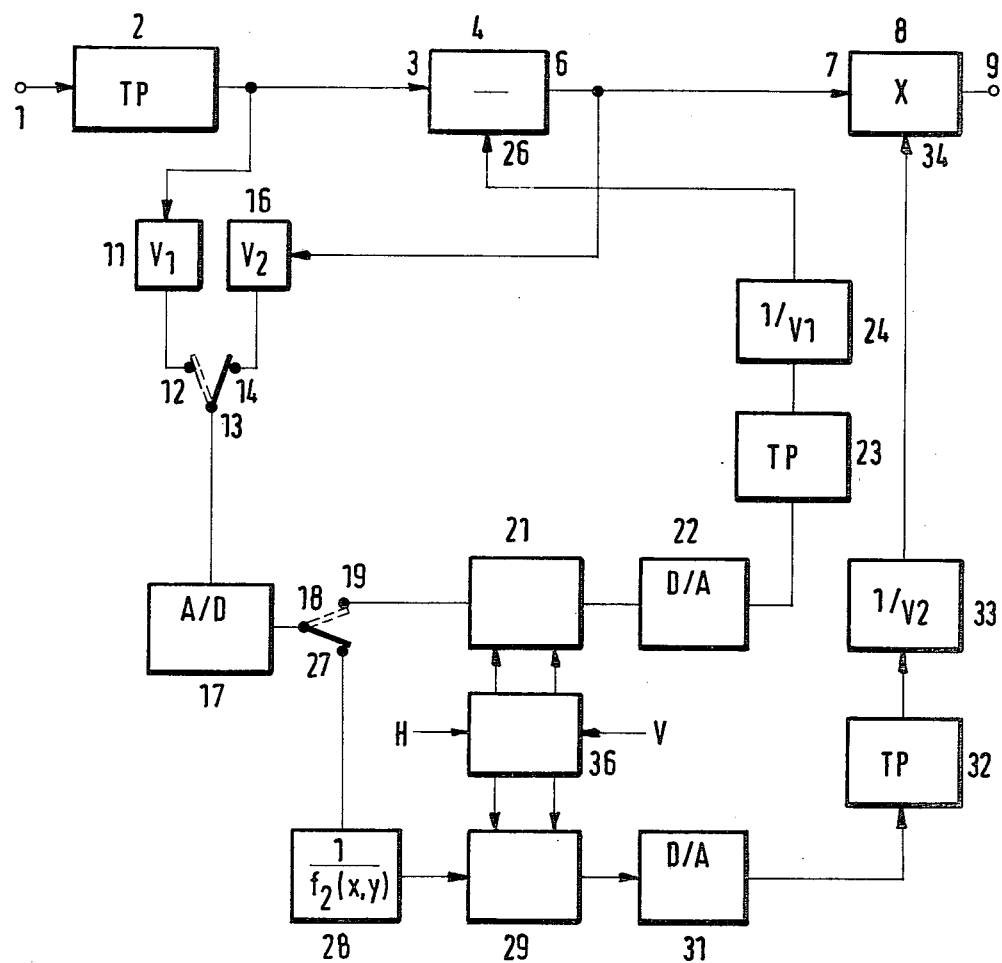
FIG. 1 is a block diagram of a circuit for carrying out the method in accordance with the invention with a single channel picture signal generator.

In the block diagram shown in FIG. 1, a video signal derived from a picture signal generator and which is to be corrected for additive and multiplicative spurious signals, is applied to the terminal 1. The video signal to be corrected is transmitted through a low pass filter 2 of upper frequency limit of 5 MHZ to a first input 3 of a subtraction stage 4, an output 6 from which is connected to an input 7 of a multiplication stage 8 at an output 9 of which the corrected video signal can be extracted. The output from the low pass filter 2 is also connected to one switch contact of a changeover switch 13 through an amplifier 11. The output 6 from the subtraction stage 4 is connected to a second switch contact 14 of the changeover switch 13 through a further amplifier 16. The changeover switch 13 is connected to the input to an A/D converter 17, the output of which is connected to a further changeover switch 18. A switch contact 19 of the changeover switch 18 is connected to a first store 21 which has an output connected to a D/A converter 22. The output from the D/A converter 22 is connected to a second input 26 of the subtraction stage 4 through a low pass filter 23 and an attenuator 24.

The switch contact 27 of the changeover switch 18 has a second switch contact 22 connected to a second store 29 through a reciprocal stage 28. The output from the second store 29 is connected to a D/A converter 31 the output from which is connected to a second input 34 of the multiplication stage 8 through a low pass filter 32 and an attenuator 33.

For the compensation of additive spurious signals, a signal which only contains the additive spurious signals is derived for all picture elements from the "black level" signal of the video signal during the time, for example, the light current is interrupted by covering the picture gate or the objective of a television camera. After passing through the low pass filter 2, this signal is fed to the amplifier 11 in which it is so amplified that the full dynamic range of the subsequent store 21 and of the A/D converter 11 is utilised. The changeover switch 13 causes the amplified signal to be fed to the A/D converter 17 at the output from which a digitalised spurious signal can be extracted. This digitalised spurious signal is stored in the first store 21 when the changeover switch 18 connects the store 21 to the converter 17.

During normal operation of the picture signal generator, the value stored in the store 21 is read-out in synchronism with the scanning of the picture signal generator using a counter 36 to which are fed pulses of H and/or V frequency. After D/A conversion in the converter 22, this signal is fed through the low pass filter 23 to the attenuator 24 in which a level reduction takes place matching it to the level of the video signal. This attenuated signal is fed to the subtraction stage 4 through the input 26 and is subtracted from the video signal. A video signal without additive spurious components is then present at the output 6 from the subtraction stage 4.

For detecting and compensating for the multiplicative spurious components, scanning takes place in the picture signal generator with an open picture gate or by scanning the "white level" at about 100% level. This signal value is taken at the output 6 from the subtraction stage 4 and is fed to the amplifier 16. In a similar manner to that described above, the amplified signal is fed through the changeover switch 13 to the A/D converter 17 in which it is digitalised. Through the changeover switch 18, it is applied to the reciprocal value stage 28. The reciprocal function of the digitalised spurious signal generated therein is then stored in the store 29. The reciprocal stage 28 can also be arranged after the store 29 so that the reciprocal function is first generated during the read-out from the store 29.

During normal operation of the picture signal generator, the store 29 is then read-out in synchronism with the scanning switch again using the counter 36 and after D/A conversion in the converter 31, the signal is fed through the low pass filter 32 to the attenuator 33. Here an amplifying matching to the video signal also takes place once again. Thereafter, this signal is fed to the input 34 of the multiplication stage 8 and is multiplied with the video signal. The video signal fully compensated for spurious signals can be extracted at the output 9 from the multiplication stage 8. Known multipliers, particularly four-quadrant multipliers can be used as the multiplication stage 8, since they operate in a stable manner and do not adversely influence the band width or the signal-noise ratio of the video signal.

A block diagram of a 3-channel RGB system, for example the signal channels of a colour T.V. camera, is illustrated in FIG. 2. For better understanding, the same references as in FIG. 1 have been used in this figure for the same parts. Moreover, the blocks 37, 37', 37", which comprise the low pass filter 2 and the amplifiers 11 and 16 as well as the changeover switch 13, are required in triplicate. Likewise, three stores 21, 21', 21" and three stores 29, 29', 29" and the subsequent circuits comprising respectively a D/A converter 22 or 31, a low pass filter 23 or 32, an attenuator 24 or 33 and subtraction stages 4 as well as multiplication stages 8 are required in triplicate. On the other hand, the A/D converter 17 need be provided only once because the spurious signals from the individual channels can be detected one after the other in time, for example line by line or field by field. For switching over the A/D converter 17 to the individual channels, a changeover switch 38 is provided with three selectable switching points, the switching point 39 being connected to the first channel (red), the switching point 40 being connected to the second channel (green), and the switching point 41 being connected to the third channel (blue). A further changeover switch 42 is arranged between the changeover switch 18 and the stores 21, 21', 21" for the corresponding channels. A further changeover switch 43 is provided for the corresponding channels between the reciprocal value stage 28 and the stores 29, 29', 29". The method of operation of the three channel circuit corresponds to that of the single channel circuit described in FIG. 1. The respective spurious signal compensated video signal red or green or blue can then be extracted at the respective output terminals 9 or 9' or 9".

We claim:

1. A method for compensating for spurious signals in a video signal produced by a picture signal generator, comprising the steps of deriving a first signal from the black level signal of the video signal for all picture elements, storing said first signal, reading out said first signal in synchronism with the video signal to be corrected, subtracting a thus formed first compensating signal from the video signal, deriving a second signal from the white level signal of the video signal for all picture elements, producing the reciprocal value of the second signal, storing said reciprocal value, reading out said stored value in synchronism with the video signal to be corrected, and multiplying a thus formed second correction signal with the video signal.

2. A method according to claim 1 and comprising digitalising the first and second signals, storing the digitalised signals, and subjecting the read-out signals to digital to analogue conversion.

3. A method according to claim 1 wherein the first and second signals are sequentially digitalised and are read-out in parallel.

4. A method according to claim 1 wherein the first and second signals are amplified before storing whereby the full dynamic range of the A/D converter and store is utilised.

5. Apparatus for compensating for spurious signals in a video signal comprising a subtraction stage (4) having a first input (3) to which is applied a video signal to be corrected and a second input (26), means for deriving a first signal from the black level of the video signal, a first store (21) having an input for receiving the first signal and having an output connected to the second input (26) of the subtraction stage (4), the store (21) also having control inputs connected to outputs from counting means (36) for synchronising the read-out of the signals in the store (21) with the video signal, a multiplication stage (8) having a first input (7) connected to an output (6) from the subtraction stage (4), a reciprocal value stage (28) having an input connected to the output (6) from the subtraction stage (4), means for deriving a second signal from the white level of the video signal, and a second store (29) for storing the second signal, and having an input to which is connected to the output from the reciprocal value stage (28) and control inputs connected to outputs from counting means (36), the second stage (29) further having an output connected to a second input (34) of the multiplication stage (8), a corrected video signal being extracted from an output (9) of the multiplication stage.

6. A circuit according to claim 5 wherein the respective inputs to the first store (21) and second store (29) are connected through a first changeover switch (18) to an output from an A/D converter (17), an input to which is connected through a second changeover switch (13) to the respective first input of the subtraction stage (4) and multiplication stage (8), and wherein the respective outputs from the stores (21, 29) are each connected through a D/A converter (22, 31) to the respective second input (26, 34) to the subtraction stage (4) and the multiplication stage (8).

7. A circuit according to claim 6 wherein an amplifier (11, 16) is connected between the second changeover switch (13) and the respective first input (3, 7) of the subtraction stage (4) and the multiplication stage (8), and wherein a respective attenuator (24, 33) is arranged between the output to each D/A converter (22, 31) and the respective second input (26, 34) of the subtraction stage (4) and the multiplication stage (8).

8. A circuit according to claim 5 for spurious signal compensation in more than one video signal channel, wherein a plurality of first (21, 21', 21") and second stores (29, 29', 29"), D/A converters (22, 22', 22" or 31, 31', 31"), amplifiers (11, 11', 11", 16, 16', 16") and attenuators (24, 24', 24", 33, 33', 33") are provided corresponding in number to the number of video signal channels (R,G,B), and wherein a single A/D converter (17) is provided between the amplifiers (11, 11', 11", 16, 16', 61") and the stores (21, 21', 21", 29, 29', 29"), an output from which converter is connected to a third changeover switch (38) for the various video signal channels (R,G,B), said third switch (38) having an output connected to the first changeover switch (18), and a single reciprocal value stage (28) is provided between the first changeover switch (18) and the stores (29, 29', 29") for the correction of multiplicative spurious signals, a fourth changeover switch (43) being connected between an output from the reciprocal value stage (18) and inputs to the stores (29, 29', 29") and the first changeover switch (18) being also connected directly through a fifth changeover switch (42) to the stores (21, 21', 21") for the correction of additive spurious signals.

* * * * *

UNITED STATES PATENT AND TRADEMARK OFFICE
CERTIFICATE OF CORRECTION

PATENT NO. : 4,240,103
DATED : December 16, 1980
INVENTOR(S) : Dieter POETSCH et al It is certified that error appears in the above—identified patent and that said Letters Patent is hereby corrected as shown below:

PLEASE ADD THE FOLLOWING:

-- [30] Foreign Application Priority Data

Sept. 26, 1978 DE Fed. Rep. of Germany....2841727 --.

*Signed and Sealed this*

*Seventh* Day of *April 1981*

[SEAL]

*Attest:*

RENE D. TEGTMEYER

*Attesting Officer*    *Acting Commissioner of Patents and Trademarks*